(12) United States Patent
LaFrese et al.

(10) Patent No.: US 8,117,619 B2
(45) Date of Patent: Feb. 14, 2012

(54) SYSTEM AND METHOD FOR IDENTIFYING LEAST BUSY RESOURCES IN A STORAGE SYSTEM USING VALUES ASSIGNED IN A HIERARCHICAL TREE STRUCTURE

(75) Inventors: Lee Charles LaFrese, Tucson, AZ (US); Joshua Douglas Martin, Tucson, AZ (US); Justin Thomson Miller, Tucson, AZ (US); Vernon Walter Miller, Tucson, AZ (US); James Russell Thompson, Tucson, AZ (US); Yan Xu, Tucson, AZ (US); Olga Yiparaki, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 11/849,047

(22) Filed: Aug. 31, 2007

(65) Prior Publication Data

US 2009/0064159 A1 Mar. 5, 2009

(51) Int. Cl.
*G06F 9/46* (2006.01)
*G06F 3/06* (2006.01)
*G06F 13/00* (2006.01)
(52) U.S. Cl. .............................. 718/104; 711/4; 711/111
(58) Field of Classification Search .................. 718/104, 718/105; 370/252; 711/4, 100, 162, 170
See application file for complete search history.

(56) References Cited

U.S. PATENT DOCUMENTS

| 4,633,387 | A | 12/1986 | Hartung et al. ............... 364/200 |
| 6,125,394 | A * | 9/2000 | Rabinovich ................... 709/226 |
| 6,813,686 | B1 * | 11/2004 | Black .......................... 711/114 |
| 7,062,628 | B2 * | 6/2006 | Amano ......................... 711/170 |
| 7,308,528 | B2 * | 12/2007 | Kitamura et al. ............. 711/111 |
| 7,590,746 | B2 * | 9/2009 | Slater et al. .................. 709/229 |
| 7,640,547 | B2 * | 12/2009 | Neiman et al. ................ 718/104 |
| 7,675,866 | B1 * | 3/2010 | Pauly ............................ 370/252 |
| 7,886,299 | B2 * | 2/2011 | Kitamura ...................... 718/104 |
| 2003/0031176 | A1 | 2/2003 | Sim ............................... 370/392 |
| 2003/0126200 | A1 | 7/2003 | Wolff ............................ 709/203 |
| 2005/0149940 | A1 * | 7/2005 | Calinescu et al. ............. 718/104 |
| 2008/0117867 | A1 * | 5/2008 | Yin et al. ...................... 370/329 |

* cited by examiner

*Primary Examiner* — Jennifer To
*Assistant Examiner* — Louis Diep
(74) *Attorney, Agent, or Firm* — Kunzler Needham Massey & Thorpe

(57) ABSTRACT

An apparatus, system and method to optimize load distribution across logical and physical resources in a storage system. An apparatus in accordance with the invention may include an availability module and an allocation module. The availability module may dynamically assign values to resources in a hierarchical tree structure. Each value may correspond to an availability parameter such as allocated volumes, current resource utilization, and historic resource utilization. The allocation module may serially process the values and allocate a load to a least busy resource in the hierarchical tree structure based on the assigned values.

17 Claims, 7 Drawing Sheets

SYSTEM AND METHOD FOR IDENTIFYING LEAST BUSY RESOURCES IN A STORAGE SYSTEM USING VALUES ASSIGNED IN A HIERARCHICAL TREE STRUCTURE

BACKGROUND OF THE INVENTION

1. Field of the Invention

The invention relates to systems and methods for distributing load across multiple resources. Specifically, the invention relates to systems and methods for optimizing load distribution and balance across logical and physical resources in a storage system.

2. Description of the Related Art

Virtual tape libraries ("VTLs") provide significant advantages in convenience and performance relative to the tape libraries conventionally used for archival data storage. VTLs typically back up and restore data faster and more reliably than their conventional tape library counterparts due to their unique ability to consolidate and randomly access data. Further, VTLs may operate in conjunction with conventional tape libraries, thereby providing redundancy and increased reliability.

The hardware underlying a VTL may be hierarchical, such that a load may be distributed across multiple disk storage subsystems, across storage enclosures within a disk subsystem, and across disk arrays within a storage enclosure. An imbalance in load distribution may create various bottlenecks within the hierarchy that slow overall VTL performance.

Existing methods to allocate load within a hierarchical storage structure often result in load imbalances at various levels within the hierarchy. For example, the "spill-and-fill" method identifies a single resource (ie. disk storage subsystem) from which to allocate logical units of data positioned below the resource in the hierarchy. When those logical units of data are exhausted, allocation proceeds to logical units of data positioned below another identified resource. Accordingly, the "spill-and-fill" method, while simple to implement, tends to leave many resources idle while a few resources bear the entire load.

The "round-robin" approach provides a more effective alternative to the "spill-and-fill" method in balancing load across system resources in a hierarchy. Particularly, the "round-robin" method systematically allocates load across each level of the hierarchy, proceeding from a top level to a bottom level. In some cases, however, this method may also cause load imbalance. For example, load allocation may be driven by two users whose requests are interleaved. As a result, one user's logical units may be primarily positioned beneath one half of the system resources, while the other user's logical units may be primarily positioned beneath the other half. Further, the "round-robin" approach fails to take into account other variables, such as current load per resource or historical load per resource, which may affect overall load balance.

From the foregoing discussion, it should be apparent that a need exists for a system and method to optimize load distribution across logical and physical resources in a storage system. Beneficially, such a system and method would organize logical and physical resources into a hierarchical tree structure that may be used to dynamically identify a most available resource based on a plurality of factors. Such a system and method are disclosed and claimed herein.

SUMMARY OF THE INVENTION

The present invention has been developed in response to the present state of the art, and in particular, in response to the problems and needs in the art that have not yet been met for optimizing load distribution across physical resources in a storage hierarchy. Accordingly, the present invention has been developed to provide an apparatus, system and method for optimizing load distribution across logical and physical resources in a storage system that overcomes many or all of the above-discussed shortcomings in the art.

An apparatus for optimizing load distribution across logical and physical resources in a storage system in accordance with the present invention may include an availability module, an allocation module and, in some embodiments, an organization module. The organization module may organize logical and physical resources into a hierarchical tree structure. Resources may include resources in a virtual tape library such as a cache controller, a disk controller, an enclosure, a disk array, and a logical unit.

The availability module may dynamically assign values to the resources to reflect availability. Each value may correspond to an availability parameter such as allocated volumes, current resource utilization, and historic resource utilization. In some embodiments, the availability module includes a balance module, a current utilization module, and an historical utilization module. The balance module may determine existing volume allocations for a particular resource and assign a value to the resource to reflect the same. The current utilization module may determine current utilization of a resource and assign a corresponding value to the resource. Finally, the historical utilization module may determine historical utilization of a resource over a predetermined period of time and assign a corresponding value to the resource.

The allocation module may allocate a load to a resource in the hierarchical tree structure that is identified, based on the assigned values, as least busy. In some embodiments, the allocation module processes each of the assigned values serially from a most significant value to a least significant value to identify the least busy resource. The assigned values may be weighted to achieve optimal load balance. In one embodiment, the least busy resource is located at the lowest level of the hierarchical tree structure.

A method of the present invention is also presented for optimizing load distribution across logical and physical resources in a storage system. The method may organize resources into a hierarchical tree structure and dynamically assign values to the resources. In one embodiment, the resources are resources in a virtual tape library. The values may correspond to availability parameters such as allocated volumes, current resource utilization, and historic resource utilization.

The values may then be serially processed from a most significant value to a least significant value. In one embodiment, for example, the most significant value corresponds to allocated volumes and the least significant value corresponds to historic resource utilization. A least busy resource in the hierarchical tree structure may be identified based on the values, and a load may be allocated thereto.

In some embodiments, serially processing the values includes determining an average allocated volumes value for the resources, and identifying a subset of the resources having allocated volumes values less than or equal to a predetermined percentage of the average allocated volumes value. This subset may be narrowed to those resources having current utilization values less than or equal to a predetermined current utilization value, and then to those having historic resource utilization values less than or equal to a predetermined historic resource utilization value. In some embodiments, the subset may be further limited to those resources having a lowest allocated volumes value, and then to those having an allocated volumes sum less than or equal to a predetermined allocated volumes sum.

A system of the present invention is also presented for optimizing load distribution across logical and physical resources in a storage system. The system may include an application to generate a request to store data and resources configured to store data. The system may further include a storage controller to receive the request from the application and allocate storage of the data across the resources. The storage controller may include an organization module, an availability module, and an allocation module.

The organization module may organize the resources into a hierarchical tree structure. The availability module may dynamically assign values to the resources in the hierarchical tree structure. The values may correspond to various availability parameters. Finally, the allocation module may serially process the values from a most significant value to a least significant value, and allocate a load to a least busy resource in the hierarchical tree structure based on the values.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
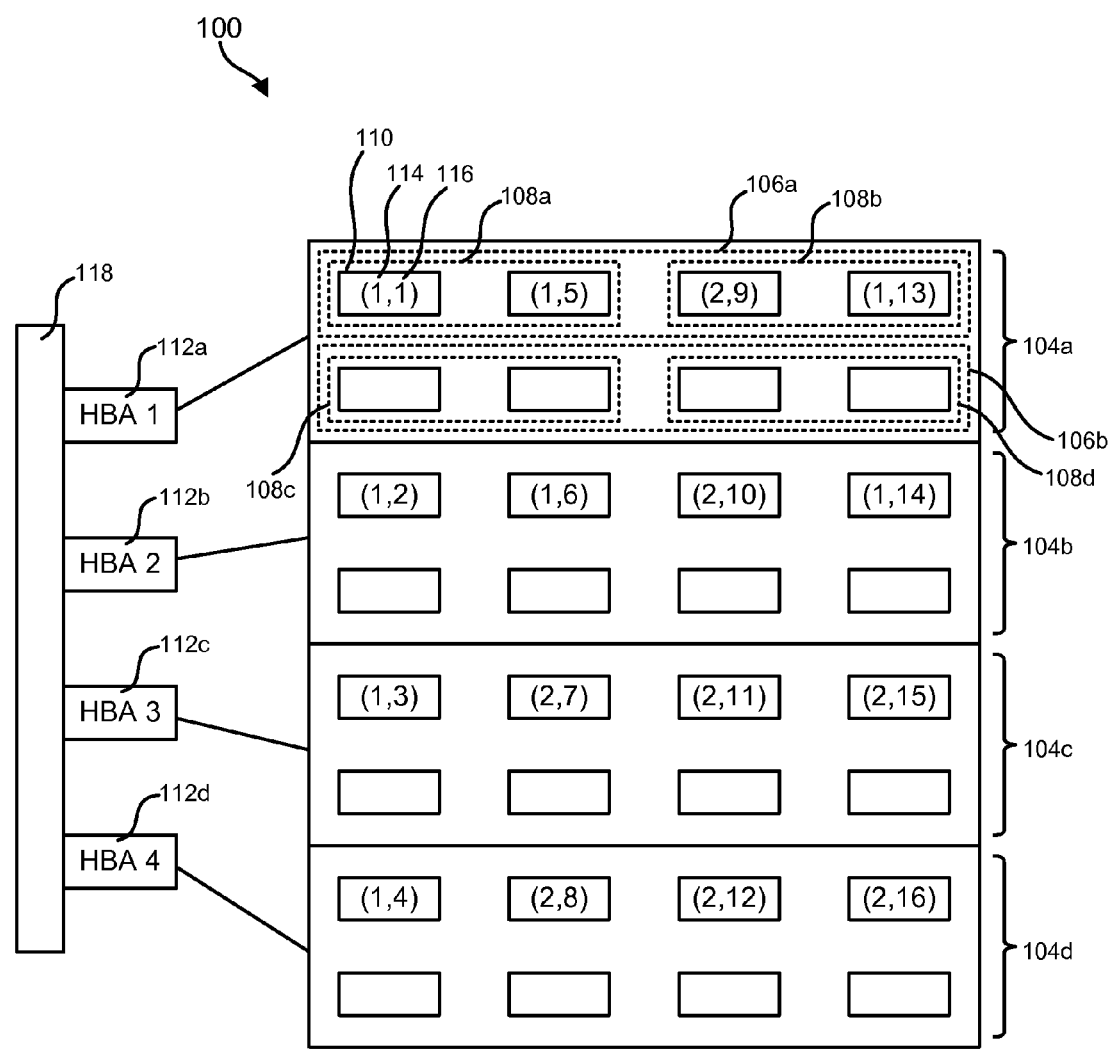
FIG. 1 is a schematic block diagram illustrating load distribution across resources in a storage system in accordance with a prior art allocation approach.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, H software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, material, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Embodiments of the present invention teach an apparatus, system and method for distributing a load across multiple resources in a hierarchical storage system. In one embodiment, the hierarchical storage system may include logical resources and physical resources, or hardware, underlying a virtual tape library system. Such logical and physical resources may include, for example, multiple virtual libraries within the virtual tape library system, multiple disk storage subsystems, disk controllers, storage enclosures, disk arrays, and logical units. Accordingly, the present invention may effectively balance the load with respect to the virtual libraries, disk storage subsystems, controllers, storage enclosures within a subsystem, disk arrays within a storage enclosure, and logical disk drives or logical units within a disk array.

FIG. 1 illustrates load distribution across logical and physical resources in a virtual tape library system 100 in accordance with a prior art "round-robin" allocation approach. The virtual tape library system 100 stores data in multiple libraries (not shown) and across multiple subsystems (not shown) associated with a host system 118. Multiple controllers 104a-d are included within each subsystem. For example, controllers 104a, 104b may be associated with a first subsystem, while controllers 104c, 104d are associated with a second subsystem. Likewise, multiple storage enclosures 106 are included within each controller 104a-d, and each controller 104a-d controls multiple disk arrays 108. Multiple logical units 110 within each disk array 108 are configured to store data.

In operation, an application (not shown) residing on the host system 118 may issue a request to store data, or a request to mount a virtual volume into a virtual drive so it is ready to read/write. The storage controller (not shown) may receive the request from the host 118. In response, the storage controller may distribute the data evenly across storage adapters 112a-d associated with the host 118 such that each logical unit 110 within the virtual tape library system 100 receives the same quantity of data. Because the storage controller is ignorant to other logical and physical resources underlying the virtual tape library system 100, however, the load may be unevenly distributed with respect thereto.

Indeed, in the illustrated example, the distributed load is represented in parentheses within each logical unit 110. Within each parentheses is a number 114 representing an assigned library, followed by a number 116 representing the order in which the assignment was given. For example, the first logical unit 110 within the topmost enclosure 106 includes the load designation "(1,1)." This designation indicates that the load distributed to the first logical unit 110 was assigned to the first library, and was the first assignment for the system. Similarly, the second logical unit 110 within the topmost enclosure 106 has the designation "(1,5)," indicating that the load was assigned to the first library and was the fifth assignment for the system.

As shown in FIG. 1, while a load distributed in accordance with the "round-robin" allocation approach may result in even load distribution across both storage adapters 112 and logical units 110, the load may not be evenly distributed across other logical and physical resources 104, 106, 108 underlying the virtual tape library system 100. In the present example, the load was distributed across each logical unit 110 in a first enclosure 106a, while every logical unit 110 in a second enclosure 106b was left idle. Similarly, the load was evenly distributed across disk arrays 108a, 108b in the first enclosure 106a, while disk arrays 108c, 108d in the second enclosure 106b were left void.

Figure 2:
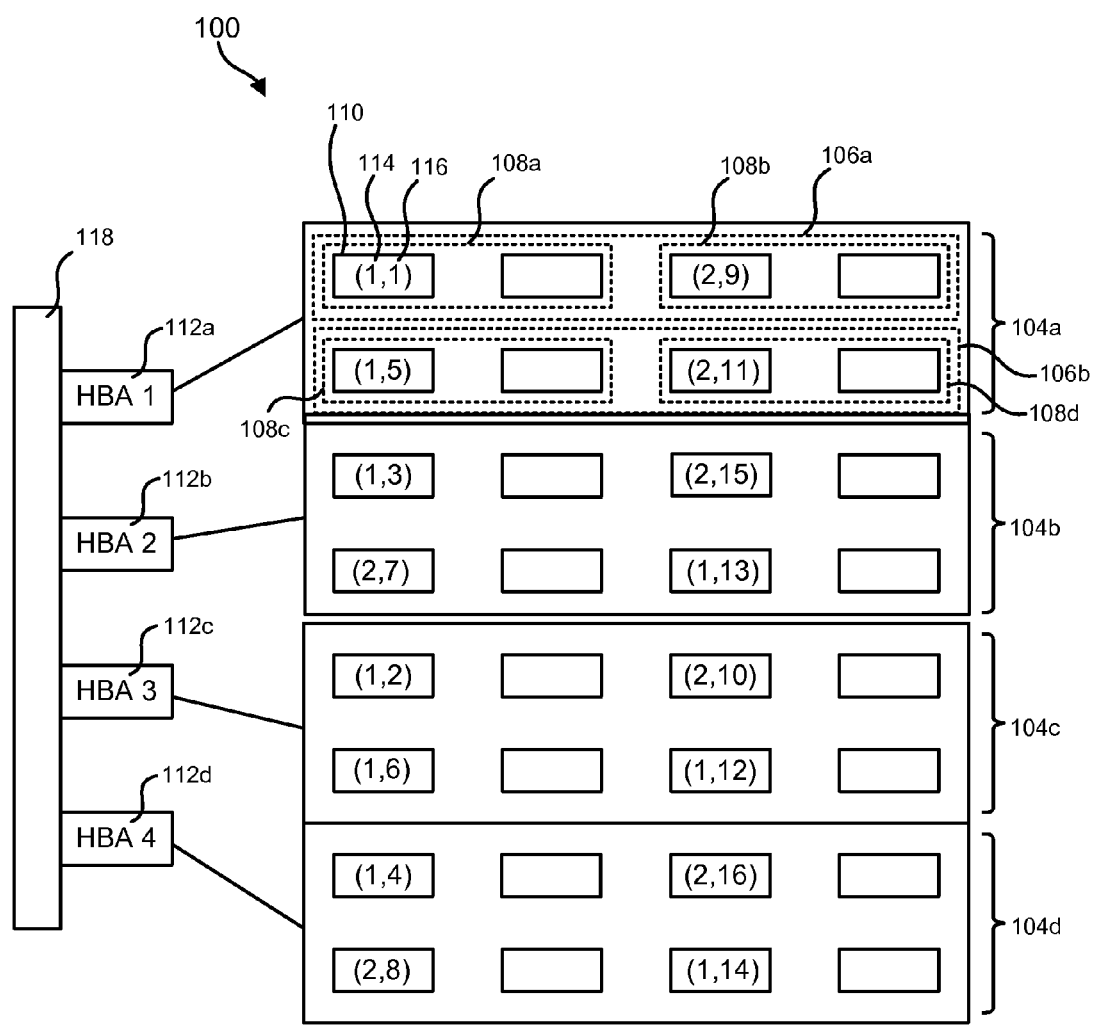
FIG. 2 is a schematic block diagram illustrating load distribution across resources in a storage system in accordance with embodiments of the present invention.

Referring now to FIG. 2, load distribution in accordance with embodiments of the present invention may overcome the limitations of the prior art. Particularly, systems in accordance with the present invention may evenly distribute a load across all logical and physical resources underlying a virtual tape library system 100 or other storage structure.

Specifically, as shown in FIG. 2, a load distributed in accordance with embodiments of the present invention may result in an even distribution of load across adapters 112a-d, subsystems (not shown), controllers 104a, 104b, enclosures 106, arrays 108, logical units 110, and/or any other underlying logical and physical resources that may exist. In this example, controllers 104a, 104b are associated with a first subsystem and controllers 104c, 104d are associated with a second subsystem. The load is evenly spread across adapters 112a-d, and distributed such that half of the available logical units 110 are utilized. The load is further evenly distributed across subsystems, controllers 104, enclosures 106, and arrays 104, such that each underlying logical and physical resource is utilized at half capacity.

Figure 3:
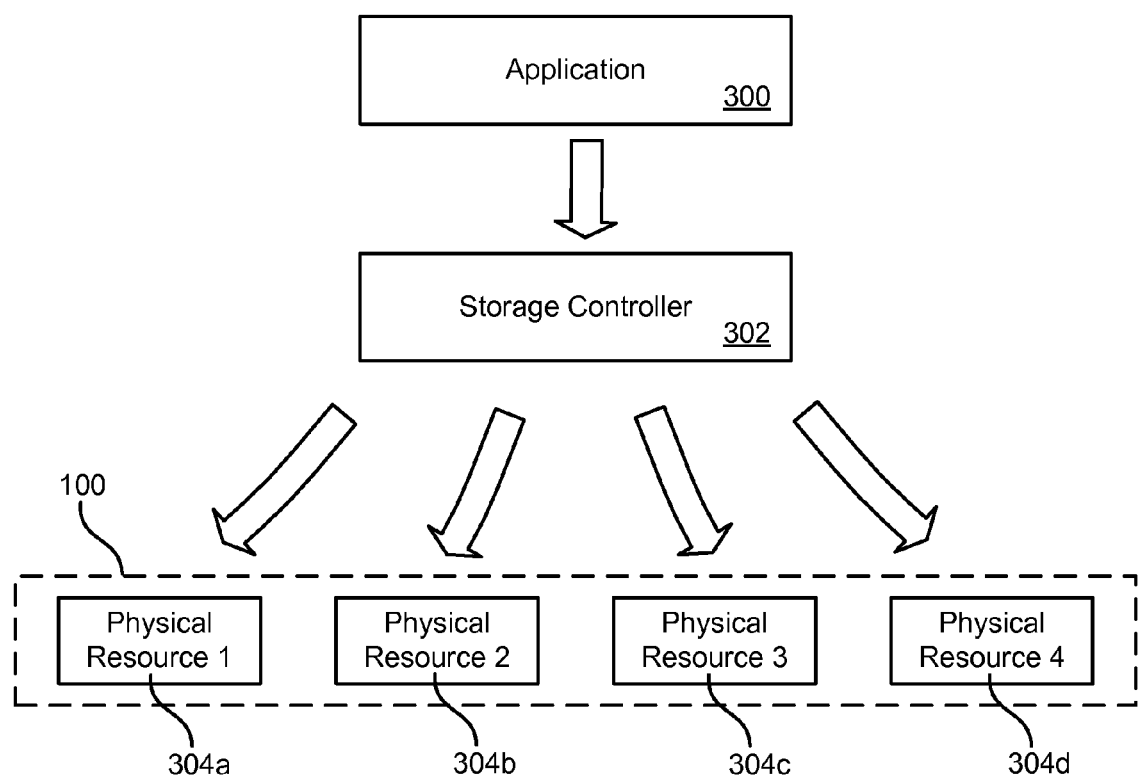
FIG. 3 is a block diagram illustrating one embodiment of a system for distributing load across resources in a storage system in accordance with the present invention.

Referring now to FIG. 3, a system to optimize load distribution across logical and physical resources in a storage system in accordance with the present invention may include an application 300 residing on a host system 118, and a storage controller 302. The application 300 may generate and transmit a request to store data, or a request to mount a virtual volume into a virtual drive so it is ready to read/write, to the storage controller 302. The storage controller 302 may receive the request, which may trigger events to optimize load distribution in accordance with the present invention, as set forth below with reference to FIG. 4. The storage controller 302 may further initialize resources underlying a virtual tape library system 100 associated with the host system 118 to receive and store the data. The application 300 may then transmit the data to the storage controller 302, which may then allocate the data to the various logical and physical resources 304a-d underlying the virtual tape library 100.

Figure 4:
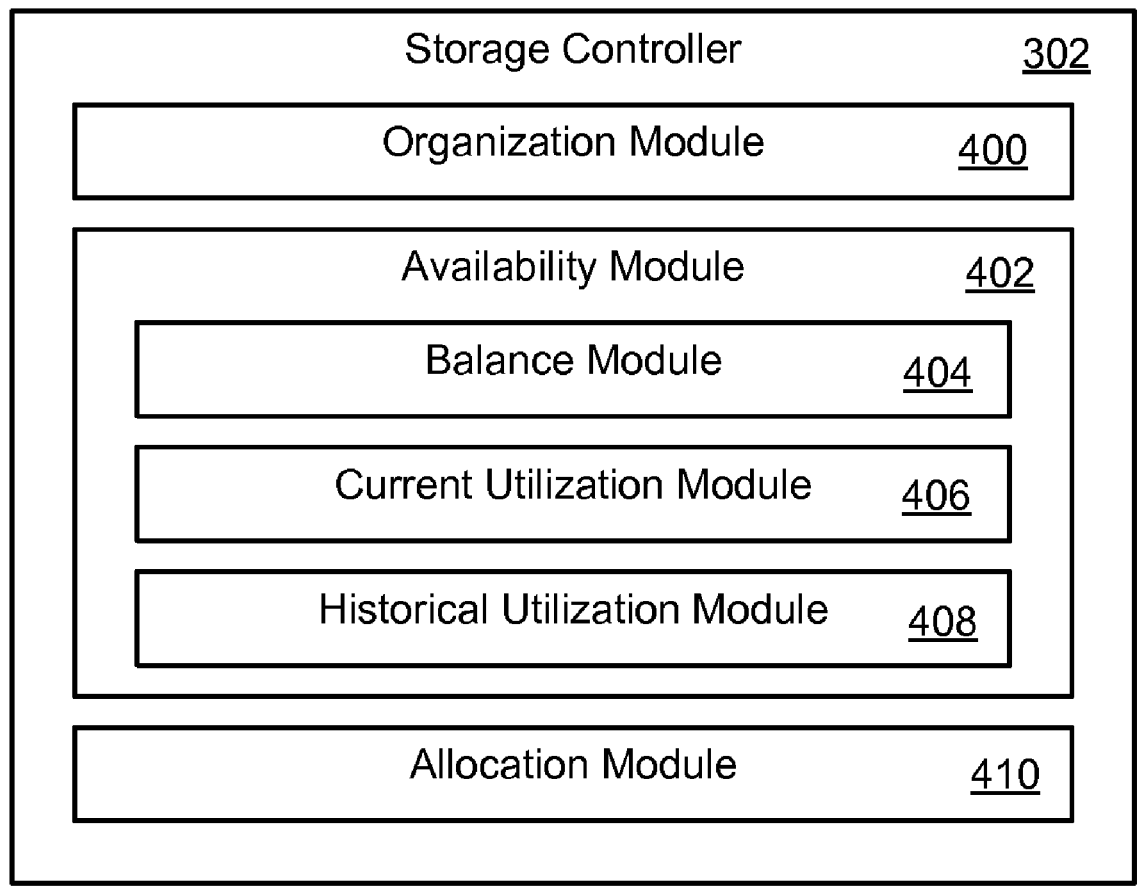
FIG. 4 is a block diagram detailing components of an apparatus for optimizing load distribution in accordance with certain embodiments of the invention.

Referring now to FIG. 4, a storage controller 302 in accordance with the present invention may include an organization module 400, an availability module 402, and an allocation module 410 to optimize load distribution across logical and physical resources in a storage system. The organization module 400 may organize the logical and physical resources into a hierarchical tree structure, as discussed in more detail with reference to FIG. 5 below. This hierarchical tree structure may be fundamental to optimizing load distribution in accordance with embodiments of the present invention. Indeed, the load borne by a particular resource in the hierarchical tree structure may be determined by assessing the load borne by resources hierarchically below it. As a result, balanced load distribution at the lowest level of the hierarchical tree structure is paramount to optimal load distribution across all resources.

The availability module 402 may dynamically assign values to each of the resources in the hierarchical tree structure according to various availability parameters. In some embodiments, the availability module 402 includes a balance module 404, a current utilization module 406, and an historical utilization module 408. The balance module 404 may determine a number of allocated logical units, or volumes, corresponding to each resource in the hierarchical tree structure. The balance module 404 may then assign a value to each resource to reflect its allocated volumes. Specifically, in some embodiments, the allocated volumes value assigned to a particular resource may correspond to a sum of the number of volumes allocated to each resource positioned below that resource in the hierarchical tree structure.

The current utilization module 406 may determine current utilization of each of the resources in the hierarchical tree structure. The current utilization module 406 may then assign a value to each resource to reflect its current utilization. In one embodiment, for example, the current utilization value assigned to a particular resource may include an integer representing all volumes currently being accessed by resources hierarchically below that particular resource. Volumes currently being accessed may include volumes currently mounted into a virtual drive or array and ready to read/write.

The historical utilization module 408 may determine historical utilization of each of the resources in the hierarchical tree structure during a predetermined period of time. The historical utilization module 408 may then assign a value to each resource to reflect its historical utilization. In one embodiment, for example, the historical utilization module 408 assigns a value to each resource that represents the sum of the number of all volumes below it in the hierarchical tree structure that have a timestamp within the predetermined period of time. The predetermined period of time may be set and/or adjusted as necessary to achieve optimal load distribution across storage resources.

In some embodiments, each of the balance module 404, current utilization module 406, and historical utilization module 408 may selectively weight the value assigned to each resource to achieve optimal load balance.

The allocation module 410 may serially process each of the values assigned by the balance module 404, current utilization module 406, and historical utilization module 408 to identify a least busy resource in the hierarchical tree structure. In one embodiment, the least busy resource may be located at a lowest level of the hierarchical tree structure to facilitate even load distribution across all resources in the hierarchy.

In one embodiment, the allocation module 410 may serially process the values from a most significant value to a least significant value. For example, the most significant value may correspond to the allocated volumes value, while the least significant value may correspond to the historic resource utilization value. Accordingly, in some embodiments, the allocation module 410 may identify a least busy resource prior to processing all of the values. In this example, the allocation module 410 may identify a least busy resource prior to processing the historic resource utilization values.

Figure 5:
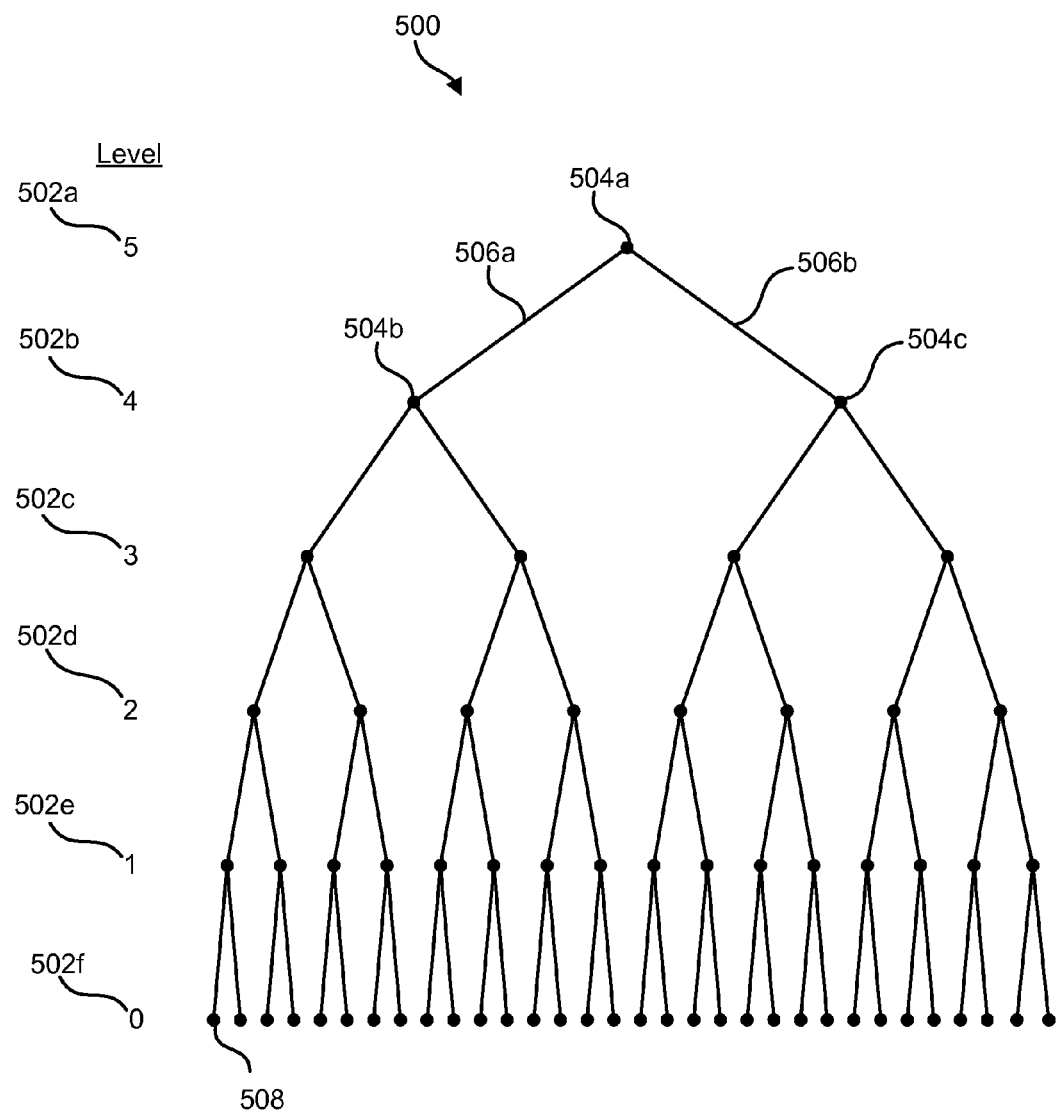
FIG. 5 is one embodiment of a hierarchical tree structure for use in optimizing load distribution in accordance with the invention.

FIG. 5 illustrates one embodiment of a hierarchical tree structure 500 for use in accordance with embodiments of the present invention. The highest level 502a of the tree structure 500 contains one empty node 504a that serves as a starting point for the present invention. The next level 502b represents the highest level 502 in the physical configuration hierarchy 500. Subsequent levels 502c-f represent lower levels in the hierarchy 500. The lowest level 502f of the hierarchy 500 includes leaves 508 that define the lowest level logical unit 110 of storage.

Nodes 504 may include logical or physical resources within a particular storage system, such as within a virtual tape library system 100. Branches 506 may extend from nodes 504 to identify subnodes 504 residing at lower levels 502 of the hierarchy 500. In one embodiment, for example, the highest level 502b of the physical configuration hierarchy 500 includes cache controllers 102 used as physical storage. The next level 502c includes disk controllers 104 in each cache controller 102. The next level 502d includes enclosures 106 in each disk controller 104, while the following level 502e includes arrays 108 within each enclosure 106. The leaves 508 of the hierarchical tree structure 500 include logical units or drives 110 defined on each array 108.

In some embodiments, the present invention enables the storage controller 302 to traverse the hierarchical tree structure 500 from a top level 502a to a bottom level 502f. Embodiments of the present invention identify a particular node 504 at each level 502 based on the values assigned thereto, as discussed with reference to FIG. 4 above. In this manner, embodiments of the present invention may finally identify a leaf 508 of the hierarchical tree 500 representing a logical or physical resource that is least busy. Storage may be allocated to the least busy resource to optimize storage distribution across all resources in the hierarchy 500.

Figure 6:
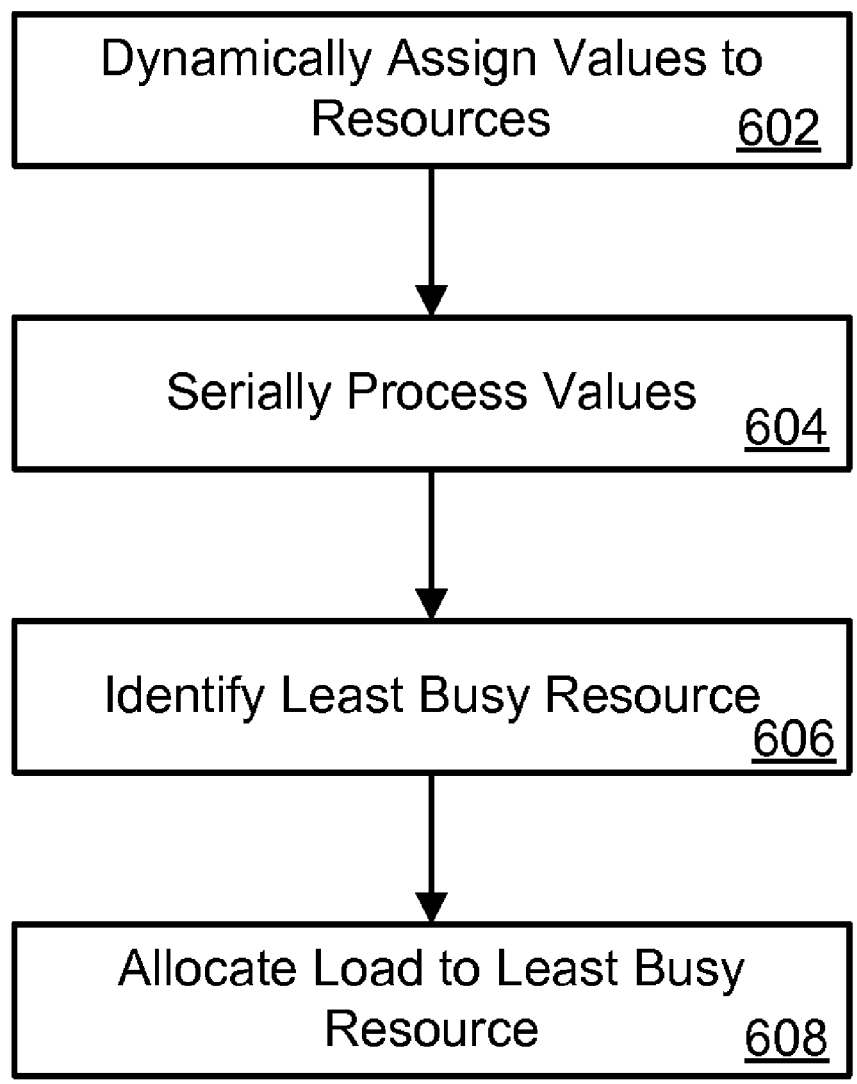
FIG. 6 is a flow chart outlining steps for optimizing load distribution in accordance with certain embodiments of the present invention.

Referring now to FIG. 6, a method 600 to optimize load distribution across multiple resources in a storage system in accordance with embodiments of the present invention may include dynamically assigning 602 values to resources in a hierarchical tree structure. The values may correspond to availability parameters, such as allocated volumes, current resource utilization, and/or historic resource utilization. The values may be serially processed 604 from a most significant value to a least significant value. In one embodiment, for example, the allocated volumes values may be processed first, followed by the current resource utilization values, and finally by the historic resource utilization values.

A least busy resource in the hierarchical tree structure 500 may be identified 606 based on the values. In some embodiments, the least busy resource may be positioned as a leaf 508 at the lowest level 502f of the hierarchical tree structure 500. A load may then be allocated 608 to the least busy resource.

Figure 7:
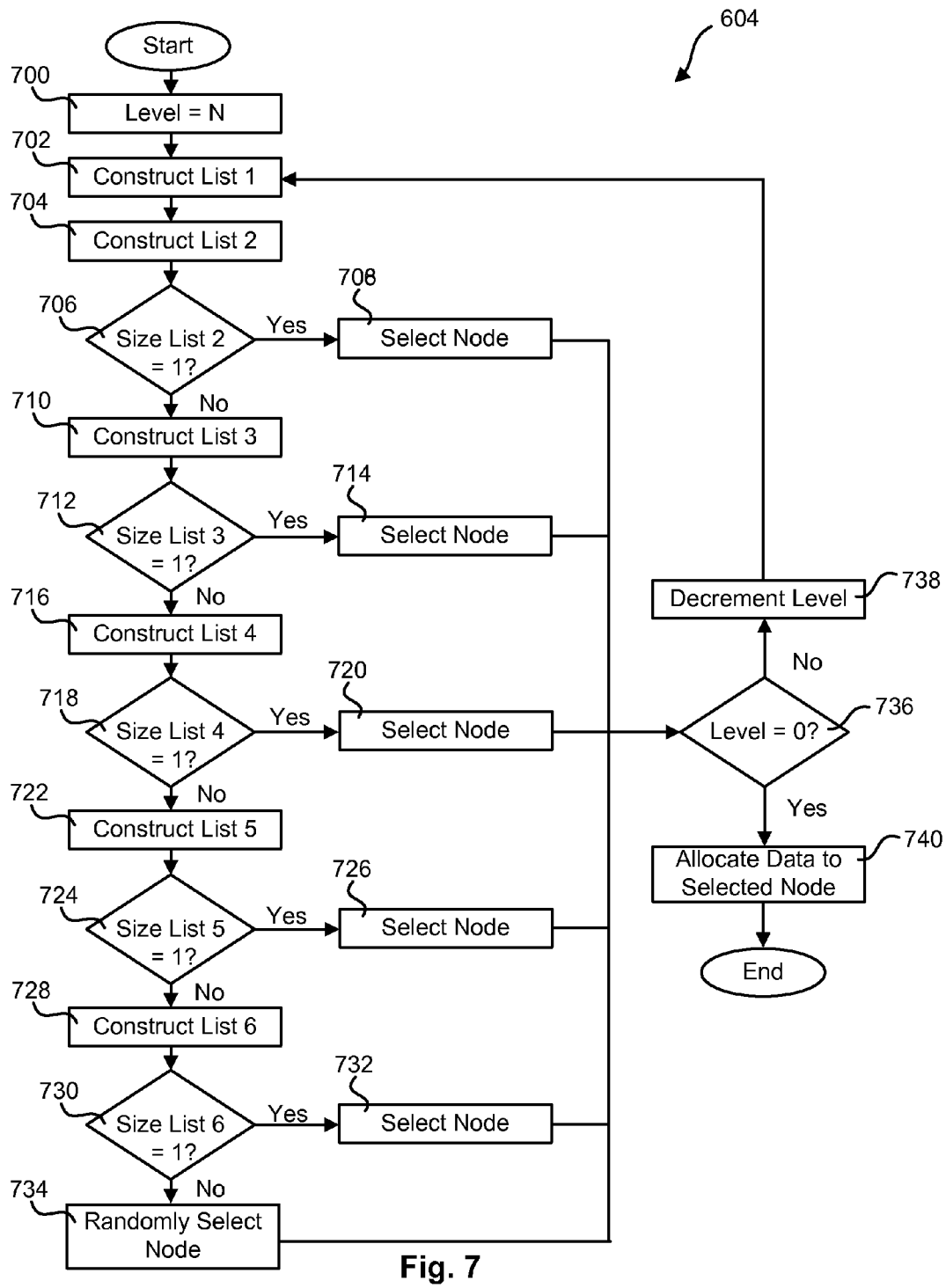
FIG. 7 is a flow chart detailing one embodiment of a method for optimizing load distribution across resources in a storage system.

Referring now to FIG. 7, in certain embodiments, processing 604 the values includes selecting 700 a highest level on the hierarchical tree structure 500 as a starting point. This starting point may be the empty node 504a referenced with respect to FIG. 5 above. A list of all available resources or nodes 504 on the next lower level 502 of the hierarchical tree structure 500 may then be constructed 702. An average allocated volumes value for all the nodes 504 in the list may be calculated, and a second list constructed 704 to include a subset of the nodes 504 contained in the first list. Specifically, the nodes 504 included in the second list may have allocated volumes values that are less than or equal to a predetermined percentage of the average allocated volumes value.

At a decision step 706, the method 600 may include determining whether there is only one node 504 included in the second list. If yes, the listed node 504 may be selected 708 for data storage. If no, a third list may be constructed 710. The third list may identify a subset of the nodes 504 contained in the second list. Specifically, the nodes 504 included in the third list may have current utilization values that are less than or equal to a predetermined current utilization value. The predetermined current utilization value may vary as needed to optimize load distribution for a specific system or implementation.

At a decision step 712, the method 600 may include determining whether there is only one node 504 listed in the third list. If yes, the node 504 in the third list may be selected 714 for data storage. If no, a fourth list may be constructed 716. The fourth list may identify a subset of nodes 504 within the third list that have historic resource utilization values less than or equal to a predetermined historic resource utilization value. As before, the predetermined historic resource utilization value may be adjusted to optimize load distribution for a specific storage system.

This process may continue for remaining decision steps 718, 724, 730. If there is more than one node 504 in the fourth list, however, the nodes 504 may be limited by constructing 722 a fifth list including those nodes 504 that have a lowest allocated volume value. If there is more than one node 504 in the fifth list, a sixth list may be constructed 728 that includes only those nodes 504 that have an allocated volumes sum that is less than or equal to a predetermined allocated volumes sum. In one embodiment, an allocated volumes sum may include a sum of the allocated volumes values for the subject node 504 and all subnodes 504 stemming from that node 504 on the hierarchy 500. Finally, if there is more than one node 504 included in the sixth list, a node 504 from the sixth list may be selected 734 at random for data storage.

At a decision step 736, if a node 504 selected for data storage at any of the process steps 708, 714, 720, 726, 732, 734 is not included as a leaf 508 at the lowest level 502f of the hierarchical tree structure 500, the hierarchy level may be decremented 738 and the method 600 repeated. If the selected node 504 is positioned at the lowest level 502f of the hierarchy 500, data may be allocated 740 to the selected node 504.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising a computer storage, to optimize load distribution across logical and physical resources in a storage system, the apparatus comprising:
   an organization module to create the hierarchical tree structure representing the plurality of resources in the storage system;
   an availability module to dynamically assign a plurality of values to each of a plurality of resources represented in the hierarchical tree structure, wherein each of the plurality of values represents availability of the resource associated with the value;
   a balance module to determine existing volume allocations corresponding to each of the plurality of resources and assign a first value of the plurality of values to each of the plurality of resources to reflect the same;
   a current utilization module to determine current utilization of each of the plurality of resources and assign a second value of the plurality of values to each of the plurality of resources to reflect the same; and
   an historical utilization module to determine historical utilization of each of the plurality of resources over a predetermined period of time and assign a third value of the plurality of values to each of the plurality of resources to reflect the same; and
   an allocation module to allocate a load to a least busy resource located at a bottom level of the hierarchical tree structure as determined from the plurality of values.

2. The apparatus of claim 1, wherein the plurality of resources comprise resources in a virtual tape library.

3. The apparatus of claim 1, wherein each of the plurality of resources is selected from the group consisting of a cache controller, a disk controller, an enclosure, a disk array, and a logical unit.

4. The apparatus of claim 1, wherein the availability parameter is selected from the group consisting of resource volume allocations, current resource utilization, historic resource utilization, and total volume allocations.

5. The apparatus of claim 1, wherein each of the plurality of values is weighted.

6. The apparatus of claim 1, wherein the allocation module processes each of the plurality of values serially from a most significant value to a least significant value as specified by a user to identify the least busy resource.

7. A method to optimize load distribution across logical and physical resources in a storage system comprising computer storage, the method comprising:
   creating a hierarchical tree structure representing each of a plurality of resources in a storage system;
   dynamically assigning a plurality of values to each of the plurality of resources represented in the hierarchical tree structure, wherein each of the plurality of values is a value representing availability of the resource associated with the value;
   serially processing the plurality of values from a most significant value to a least significant value;
   identifying a least busy resource in the hierarchical tree structure based on the plurality of values, wherein the least busy resource is located at a bottom level of the hierarchical tree structure; and
   allocating a load to the least busy resource.

8. The method of claim 7, wherein dynamically assigning the plurality of values comprises:
   assigning a first value to each of the plurality of resources to reflect allocated volumes;
   assigning a second value to each of the plurality of resources to reflect current resource utilization; and
   assigning a third value to each of the plurality of resources to reflect historical resource utilization.

9. The method of claim 7, wherein the plurality of resources comprise resources in a virtual tape library.

10. The method of claim 7, wherein the value representing availability of the resource is selected from the group consisting of allocated volumes, current resource utilization, and historic resource utilization.

11. The method of claim 10, wherein the most significant value corresponds to the allocated volumes availability parameter.

12. The method of claim 10, wherein the least significant value corresponds to the historic resource utilization availability parameter.

13. The method of claim 7, wherein serially processing the plurality of values comprises:
   determining an average allocated volumes value for the plurality of resources;
   identifying a first subset of the plurality of resources having allocated volumes values no more than a predetermined percentage of the average allocated volumes value;
   identifying a second subset of the first subset having current utilization values no more than a predetermined current utilization value;

identifying a third subset of the second subset having historic resource utilization values no more than a predetermined historic resource utilization value;

identifying a fourth subset of the third subset having a lowest allocated volumes value;

identifying a fifth subset of the fourth subset having an allocated volumes sum no more than a predetermined allocated volumes sum; and randomly identifying a least busy resource from the fifth subset.

14. A computer storage storing a program of machine-readable instructions executable by a digital processing apparatus to perform operations to optimize load distribution across logical and physical resources in a storage system, the operations comprising:

creating a hierarchical tree structure representing each of a plurality of resources in a storage system;

dynamically assigning a plurality of values to each of the plurality of resources represented in the hierarchical tree structure, wherein each of the plurality of values is a value representing availability of the resource associated with the value;

serially processing the plurality of values from a most significant value to a least significant value;

identifying a least busy resource in the hierarchical tree structure based on the plurality of values, wherein the least busy resource is located at a bottom level of the hierarchical tree structure; and allocating a load to the least busy resource.

15. The computer storage of claim 14, wherein dynamically assigning the plurality of values comprises:

assigning a first value to each of the plurality of resources to reflect allocated volumes;

assigning a second value to each of the plurality of resources to reflect current resource utilization; and assigning a third value to each of the plurality of resources to reflect historic resource utilization.

16. The computer storage of claim 14, wherein serially processing the plurality of values comprises:

determining an average allocated volumes value for the plurality of resources;

identifying a first subset of the plurality of resources having allocated volumes values no more than a predetermined percentage of the average allocated volumes value;

identifying a second subset of the first subset having current utilization values no more than a predetermined current utilization value;

identifying a third subset of the second subset having historic resource utilization values no more than a predetermined historic resource utilization value;

identifying a fourth subset of the third subset having a lowest allocated volumes value;

identifying a fifth subset of the fourth subset having an allocated volumes sum no more than a predetermined allocated volumes sum; and randomly identifying a least busy resource from the fifth subset.

17. A system to optimize load distribution across logical and physical resources in a storage system, the system comprising:

an application to generate a request to store data;

a plurality of resources comprising computer storage configured to store data; and a storage controller to receive the request and allocate storage of the data across the plurality of resources, the storage controller comprising:

an organization module to create a hierarchical tree structure representing the plurality of resources in the storage system;

an availability module to dynamically assign a plurality of values to each of the plurality of resources represented in the hierarchical tree structure, wherein each of the plurality of values is a value representing availability of the resource associated with the value; and an allocation module to serially process the plurality of values from a most significant value to a least significant value and allocate a load to a least busy resource located at a bottom level of the hierarchical tree structure based on the plurality of values.

* * * * *